US010703469B2

(12) United States Patent
Paulson et al.

(10) Patent No.: US 10,703,469 B2
(45) Date of Patent: *Jul. 7, 2020

(54) COMPACT FOLDING YOKE WITH FLEXIBLE YOKE ARMS IN A FOLDING ROTOR BLADE ASSEMBLY

(71) Applicant: Bell Helicopter Textron Inc., Fort Worth, TX (US)

(72) Inventors: Jared Mark Paulson, Fort Worth, TX (US); Tyler Wayne Baldwin, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/845,876

(22) Filed: Dec. 18, 2017

(65) Prior Publication Data

US 2019/0185152 A1 Jun. 20, 2019

(51) Int. Cl.
| B64C 27/50 | (2006.01) |
| B64C 29/00 | (2006.01) |
| B64C 27/52 | (2006.01) |
| B64C 27/48 | (2006.01) |

(52) U.S. Cl.
CPC ........... B64C 27/50 (2013.01); B64C 27/48 (2013.01); B64C 27/52 (2013.01); B64C 29/0008 (2013.01); B64C 29/0033 (2013.01)

(58) Field of Classification Search
CPC ..... B64C 27/50; B64C 27/52; B64C 29/0008; B64C 27/33; B64C 27/35; B64C 27/37; B64C 11/28

USPC .......................................................... 416/142
See application file for complete search history.

(56) References Cited

U.S. PATENT DOCUMENTS

| 2,549,886 | A | * | 4/1951 | Buivid | B64C 27/50 244/17.11 |
| 2,623,713 | A | * | 12/1952 | Foster | B64C 3/56 244/49 |
| 2,658,576 | A | * | 11/1953 | Mosinskis | B64C 27/50 416/106 |
| 3,026,942 | A | | 3/1962 | Cresap | |
| 3,153,455 | A | * | 10/1964 | Mosinskis | B64C 27/50 416/105 |
| 3,625,631 | A | | 12/1971 | Covington, Jr. et al. | |
| 3,652,185 | A | | 3/1972 | Cresap et al. | |
| 3,967,918 | A | * | 7/1976 | Mouille | B64C 27/35 416/141 |
| 4,252,504 | A | | 2/1981 | Covington et al. | |
| 4,257,739 | A | | 3/1981 | Covington et al. | |

(Continued)

OTHER PUBLICATIONS

Cravener, Kyle Thomas, "U.S. Appl. No. 15/963,516", filed Apr. 26, 2018.

(Continued)

*Primary Examiner* — David E Sosnowski
*Assistant Examiner* — Wayne A Lambert
(74) *Attorney, Agent, or Firm* — Ross T. Robinson (57) ABSTRACT

A folding yoke comprising a center yoke pivotally connected to separate foldable flexible yoke arms permits rotor blade fold about a single through bolt connection inboard of a set of bearings. In use, the compact folded arrangement of the rotor blades reduces folded aircraft dimensions in response to ever increasing restricted storage space parameters.

20 Claims, 9 Drawing Sheets

(56) References Cited

U.S. PATENT DOCUMENTS

| | | | |
|---|---|---|---|
| 4,268,222 A | 5/1981 | Bernard | |
| 4,427,340 A * | 1/1984 | Metzger | B64C 27/51 416/134 A |
| 4,522,563 A | 6/1985 | Reyes et al. | |
| 4,691,878 A | 9/1987 | Vaughan et al. | |
| 4,712,978 A * | 12/1987 | Tiemann | B64C 27/50 416/1 |
| 5,031,858 A * | 7/1991 | Schellhase | B64C 27/50 244/7 R |
| 5,054,716 A * | 10/1991 | Wilson | B64C 29/0033 244/56 |
| 5,059,094 A * | 10/1991 | Robinson | B64C 27/33 416/134 A |
| 5,096,380 A * | 3/1992 | Byrnes | B64C 27/33 416/134 A |
| 5,211,538 A * | 5/1993 | Seghal | B64C 27/50 244/17.11 |
| 5,337,974 A | 8/1994 | Rumberger et al. | |
| 5,358,381 A | 10/1994 | Covington et al. | |
| 5,645,400 A * | 7/1997 | Hunter | B64C 27/33 416/134 A |
| 5,868,351 A * | 2/1999 | Stamps | B64C 27/50 244/12.4 |
| 6,036,442 A | 3/2000 | Certain et al. | |
| 7,530,790 B2 * | 5/2009 | Cabrera | B64C 27/10 416/134 A |
| 8,360,727 B2 * | 1/2013 | Stamps | B64C 27/32 416/134 A |
| 9,156,545 B1 | 10/2015 | Fenny et al. | |
| 9,169,010 B2 | 10/2015 | Foskey et al. | |
| 9,376,206 B2 * | 6/2016 | Ross | B64C 29/0033 |
| 9,499,262 B2 | 11/2016 | Foskey et al. | |
| 2004/0026564 A1 | 2/2004 | Romani et al. | |
| 2013/0149151 A1 * | 6/2013 | Rauber | B64C 27/43 416/141 |
| 2014/0271199 A1 | 9/2014 | Maresh et al. | |
| 2014/0271222 A1 | 9/2014 | Maresh et al. | |
| 2015/0125300 A1 | 5/2015 | Stamps et al. | |
| 2016/0152329 A1 | 6/2016 | Tzeng et al. | |
| 2017/0144746 A1 | 5/2017 | Schank et al. | |
| 2017/0320567 A1 * | 11/2017 | Miller | B64C 27/33 |
| 2018/0229830 A1 | 8/2018 | Foskey et al. | |
| 2018/0244377 A1 | 8/2018 | Chan | |

OTHER PUBLICATIONS

Paulson, Jared Mark, "U.S. Appl. No. 16/016,280", filed Jun. 22, 2018.

Paulson, Jared Mark, "U.S. Appl. No. 15/845,720", filed Dec. 18, 2017.

Paulson, Jared Mark, "U.S. Appl. No. 15/845,810", filed Dec. 18, 2017.

Paulson, Jared Mark, "U.S. Appl. No. 15/845,928", filed Dec. 18, 2017.

Paulson, Jared Mark, "U.S. Appl. No. 15/845,967", filed Dec. 18, 2017.

Paulson, Jared Mark, "U.S. Appl. No. 15/846,011", filed Dec. 18, 2017.

* cited by examiner

COMPACT FOLDING YOKE WITH FLEXIBLE YOKE ARMS IN A FOLDING ROTOR BLADE ASSEMBLY

CROSS-REFERENCE TO RELATED APPLICATIONS

This patent application is related to U.S. Published Patent Application 2019/0185150, entitled "Split Yoke In A Folding Rotor Blade Assembly," U.S. Published Patent Application 2019/0185151, entitled "Compact Folding Yoke In A Folding Rotor Blade Assembly," U.S. Published Patent Application 2019/0185141, entitled "Dual Blade Fold Bolts And Inboard Centrifugal Bearing In A Folding Rotor Blade Assembly," U.S. Published Patent Application 2019/0185, 142, entitled "Folding Spindle And Bearing Assembly In A Folding Rotor Blade Assembly," and U.S. Published Patent Application 2019/0185153, entitled "Outboard Centrifugal Force Bearing With Inboard Blade Fold Axis In A Folding Rotor Blade Assembly." Each patent application identified above is filed on the same date as this patent application and is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that the maximum number of aircraft can be accommodated within the limited storage space, the blade assemblies of some rotor systems can be folded so that each rotor blade is generally parallel with each other in order to reduce the overall profile of the blade assembly. Typically, each rotor blade is folded about a single pivot point positioned outboard of the yoke that attaches the rotor blade to the central drive mast. The single pivot point is also necessarily outboard of a set of inboard and outboard bearings that connect the rotor blade to the yoke. The distance between the inboard and outboard bearings is dependent on aircraft configuration where each configuration has an optimal distance for that particular aircraft's loads and dynamics. As a result, in order to not interfere with the bearings and preserve the optimal distance between the bearings, the pivot point of each rotor blade is typically at least that optimal distance out from the rotor blade's inboard connection to the yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

An example of a folding yoke for a rotor blade assembly includes a center yoke including a pivot hole, a flexible yoke arm connected to the center yoke at a pivotal connection through the pivot hole, and a single bearing connected to the flexible yoke arm outboard of the pivotal connection.

An example of a rotor blade assembly includes a hub spring operatively connected to a central mast, a center yoke connected to the hub spring, a flexible yoke arm pivotally connected to the center yoke at a pivot point providing a first pivot axis, and a bearing connecting the flexible yoke arm to a rotor blade, the bearing positioned on the flexible yoke arm outboard of the pivot point.

An example of a method for folding a rotor blade assembly comprising a flexible yoke arm connected to a rotor blade in a first attachment plane and pivotally connected to a center yoke including a first pivot axis in a second attachment plane, a pitch horn connected to the rotor blade at a releasable connection and at a pivotable connection including a second pivot axis, and a bearing connected to the flexible yoke arm outboard of the first pivot axis includes pitching the rotor blade such that an angle between the first attachment plane and the second attachment plane is altered, releasing the releasable connection, and rotating the flexible yoke arm about the first pivot axis and the second pivot axis.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 1A:
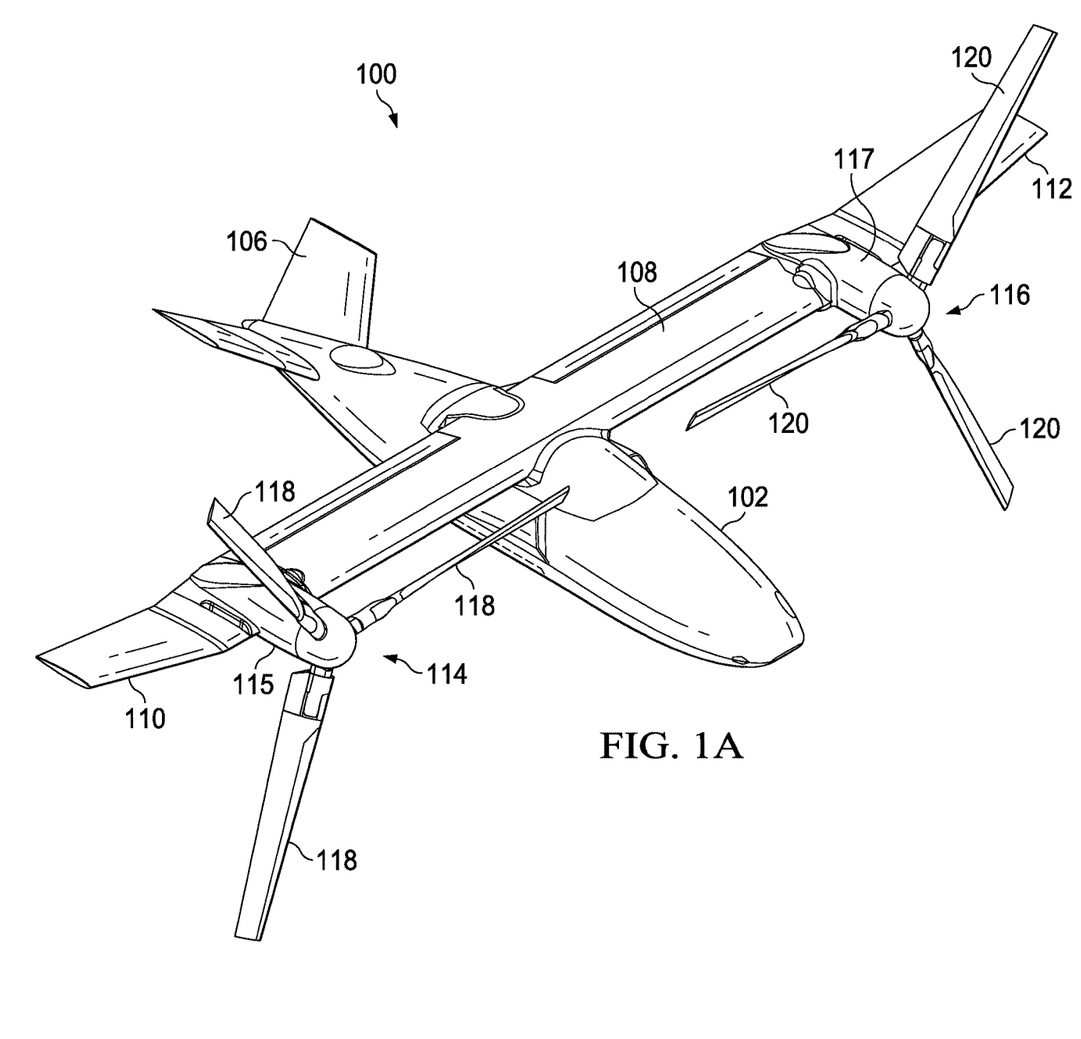
FIG. 1A is a perspective view of a tiltrotor aircraft in a flight ready position according to aspects of the disclosure.
Figure 1B:
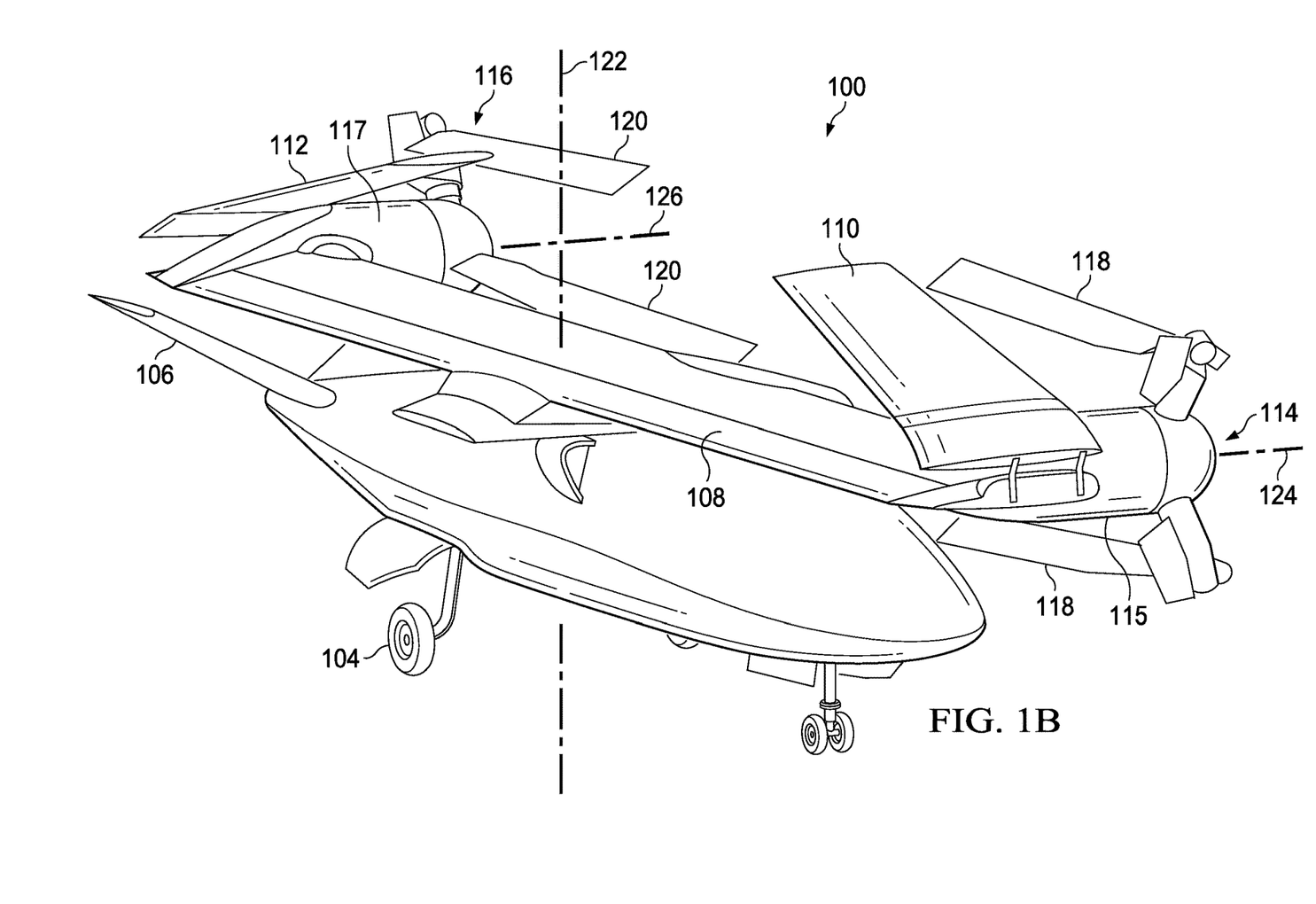
FIG. 1B is a perspective view of a tiltrotor aircraft in a stowed position according to aspects of the disclosure.
Figure 2A:
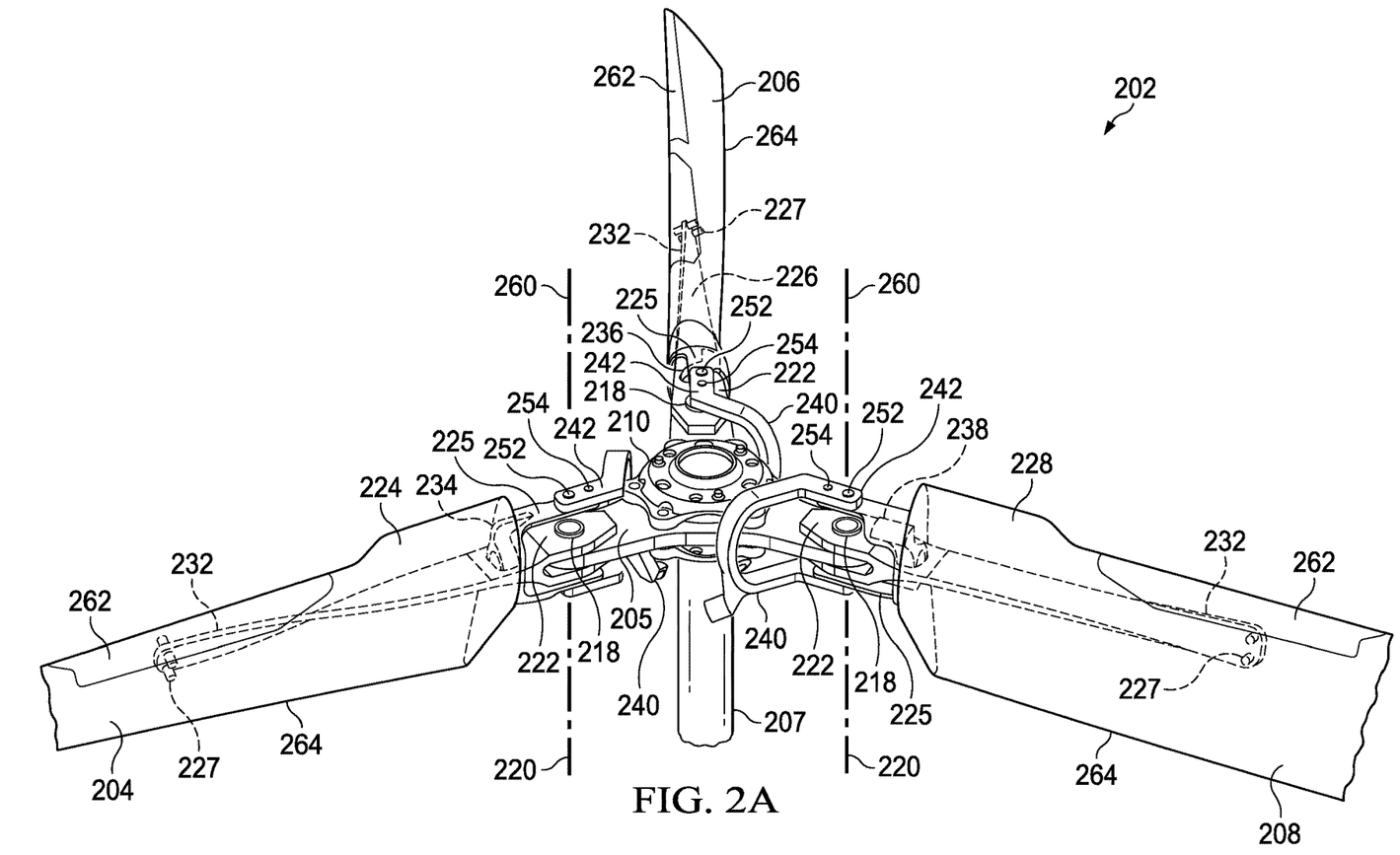
FIG. 2A is a partial perspective view of a blade assembly in an unfolded position according to one or more aspects of the disclosure.
Figure 2B:
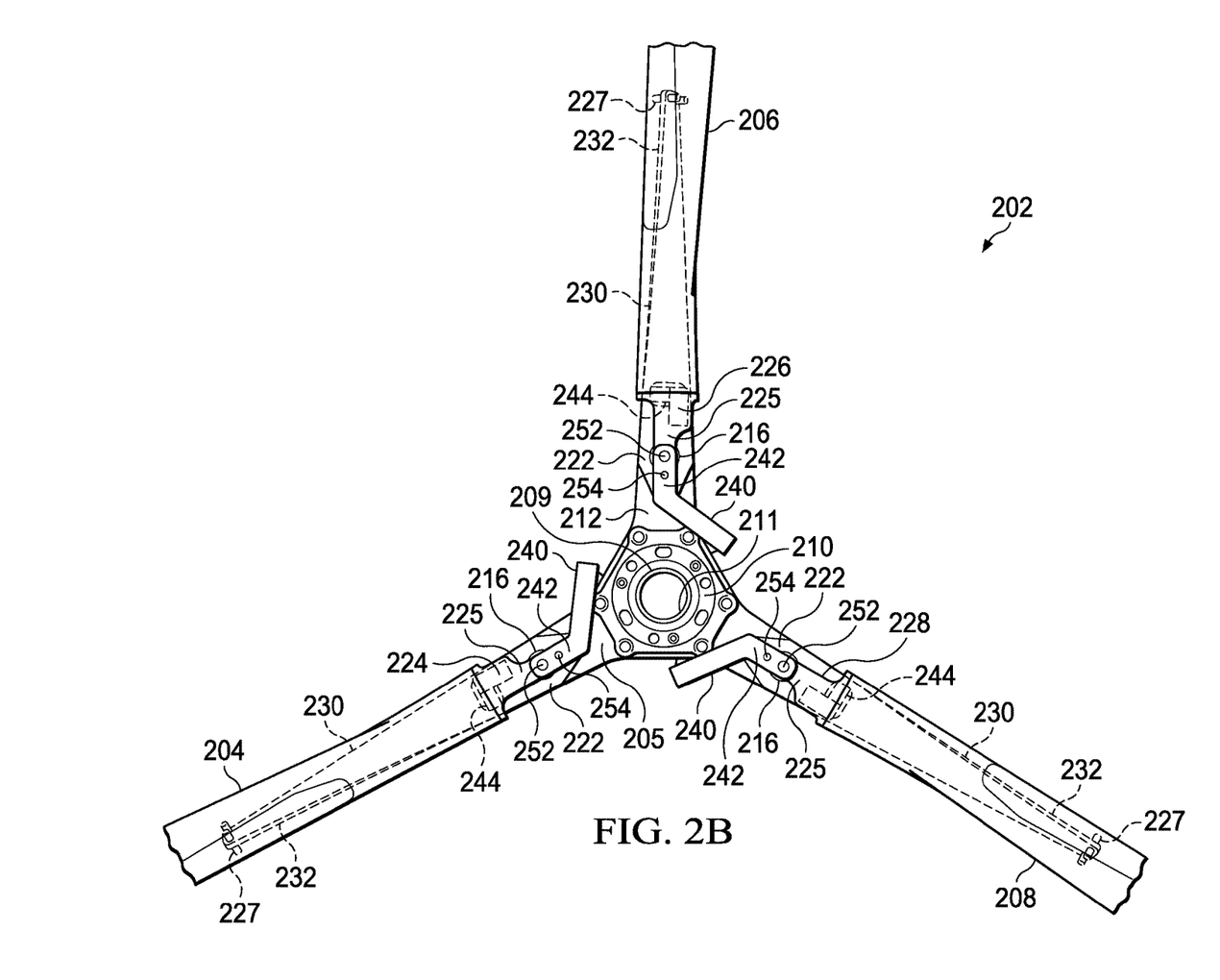
FIG. 2B is a partial top view of a blade assembly in an unfolded position according to one or more aspects of the disclosure.
Figure 2C:
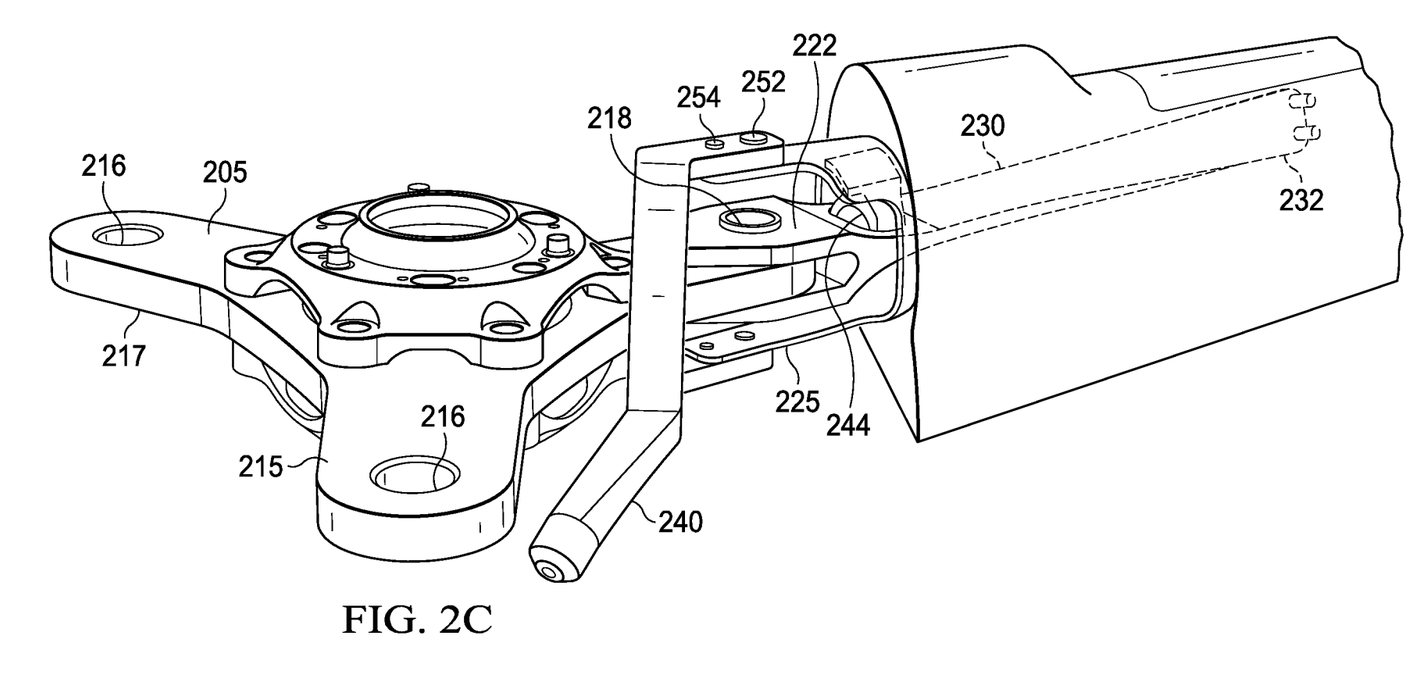
FIG. 2C is a partial perspective view of a single blade attached to a center yoke in an unfolded position according to one or more aspects of the disclosure.
Figure 2D:
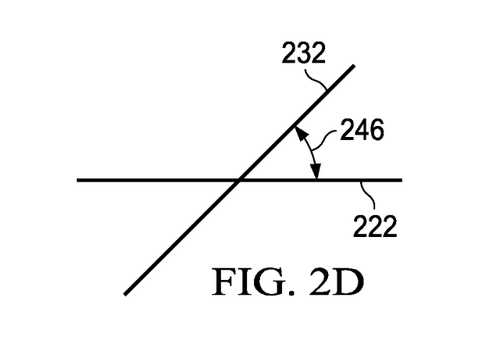
FIG. 2D is a schematic of an angle between ends of a flexible yoke arm according to one or more aspects of the disclosure.

Referring to FIGS. 1A and 1B, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is housed within nacelle 115 located on an end portion of wing 108 proximate wing tip 110, while rotor system 116 is housed within nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1A represents tiltrotor aircraft 100 in operational flying position in an airplane mode. FIG. 1B represents tiltrotor aircraft 100 in a stowed position where rotor blades 118 have been folded generally parallel with each other and rotor blades 120 have been folded generally parallel with each other in order to reduce the dimensions of the aircraft to whatever degree is required in response storage space restrictions. In the stowed position, wing 108 is swivelled approximately 90° to generally align with fuselage 102.

Generally each rotor system includes a mast driven by a power source. A rotor system includes a yoke connected to the mast and rotor blades indirectly connected to the yoke with bearings. There may be inboard bearings connecting a cuff or grip of a rotor blade to the yoke proximate the mast and outboard bearings connecting the rotor blade to an outboard end of a yoke arm. The cuff or grip may be integrally formed with the rotor blade. Other combinations of inboard and outboard bearings with or without cuffs or grips are possible as well as the removal of one or the other bearings. The bearings accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the up-and-down movement of a rotor blade positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Referring to FIGS. 2A-2D, blade assembly 202 is shown in an unfolded position. Each rotor system 114 and 116 comprises a separate blade assembly. In the interest of clarity, a single blade assembly is described herein with the understanding that tiltrotor aircraft 100 comprises a pair of similarly configured blade assemblies. Blade assembly 202 is shown in an unfolded position. In the unfolded position, each rotor blade 204, 206, and 208 is generally equally spaced from each other around the mast. For example in the three rotor blade configuration shown, 120° separates each rotor blade. It should also be appreciated that teachings regarding blade assembly 202 can apply to blade assemblies having greater or fewer rotor blades.

Hub spring 210 is connected to mast 207 through central opening 211. Folding yoke 205 includes center yoke 212 and a plurality of flexible yoke arms 230. Center yoke 212 is mounted to hub spring 210. Center yoke 212 includes a central aperture 209 axially aligned with central opening 211 sized for engagement with mast 207. Center yoke 212 defines a plurality of holes 216 equally spaced circumferentially around central aperture 209. Center yoke 212 is a singular plate having upper surface 215 opposite lower surface 217. Flexible yoke arms 230 are pivotally attached to center yoke 212 with bolts 218 through each hole 216. Holes 216 and bolts 218 share a common central axis 220. Each flexible yoke arm 230 is "foldable" with respect to center yoke 212 about central axis 220. Bolts 218 provide a pivot point about central axis 220 for each flexible yoke arm to rotate with respect to the center yoke. Each flexible yoke arm is coupled to center yoke 212 at an attachment plane 222. Attachment plane 222 is parallel to the chord of flexible yoke arm 230 at the attachment point of the flexible yoke arm to the center yoke.

Rotor blades 204, 206, and 208 each have leading edge 262 and trailing edge 264. Rotor blades 204, 206, and 208 include integrally formed split cuffs 224, 226, and 228, respectively. Each split cuff 224, 226, and 228 includes a pair of aligned flanges 225. Flanges 225 of the split cuffs are mounted to inboard beams 234, 236, and 238, respectively. The inboard beams house inboard bearings 244 which are connected to each flexible yoke arm 230. Each flexible yoke arm includes a single inboard bearing 244. The inboard bearings allow the rotor blades to flex in response to shear forces on the rotor blades due to rotation of the blade assembly. The inboard bearings are generally elastomeric bearings constructed from a rubber type material that absorbs vibration. Each rotor blade 204, 206, and 208 is coupled to a tip of a flexible yoke arm 230 with outboard yoke bolts 227 at attachment plane 232. Attachment plane 232 is parallel to the chord of flexible yoke arm 230 at the attachment point of the flexible yoke arm to the rotor blade. The inboard bearings and the flexibility of the flexible yoke arms provide for limited movement of the rotor blades relative to the folding yoke and mast to accommodate for transverse and axial forces. For example, the centrifugal force ("CF") load path on each rotor blade is from the rotor blade to the outboard yoke bolts 227, to the flexible yoke arm, through the bolt 218, and to the center yoke.

Pitch links extend from a swash plate connected to mast 207. The pitch links are connected to pitch horns 240. Each pitch horn includes a pair of aligned arms 242. Arms 242 of each pitch horn 240 are connected to flanges 225 of each split cuff 224, 226, and 228. The arms of each pitch horn are connected to the flanges of each split cuff with a pair of axially aligned pivot pins 252 and a pair of releasable pins 254. The axially aligned pivot pins 252 share a common central axis 260. The swash plate, pitch links, and pitch horns are operatively connected to an actuator to pitch the rotor blades relative to the folding yoke about the central longitudinal axis of each rotor blade. Each rotor blade is free to rotate or "pitch" about its central longitudinal axis with respect to the folding yoke such that angle 246 between attachment planes 222, 232 can range between 0° to 90°.

Figure 3A:
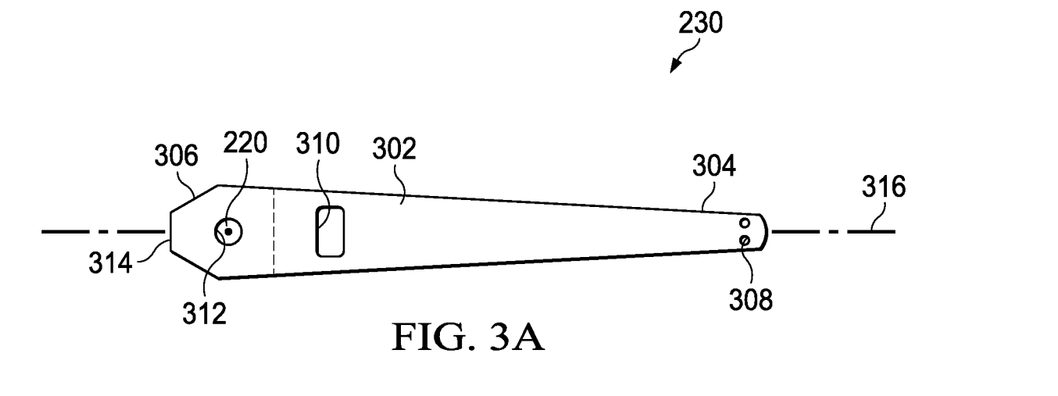
FIG. 3A is a top view of a flexible yoke arm according to one or more aspects of the disclosure.
Figure 3B:
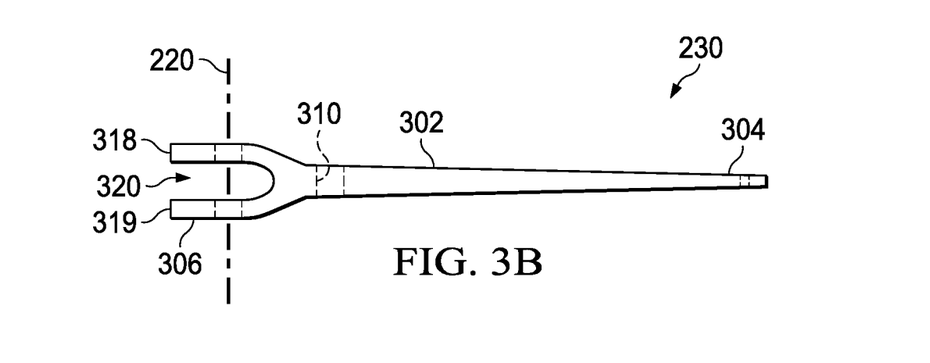
FIG. 3B is a side view of a flexible yoke arm according to one or more aspects of the disclosure.

FIGS. 3A and 3B are illustrative of flexible yoke arm 230. In the interest of clarity, a single flexible yoke arm is described herein with the understanding that a blade assembly comprises a plurality of similarly configured flexible yoke arms. Flexible yoke arm 230 includes body 302 having outboard end 304 opposite inboard end 306. Outboard end 304 includes a pattern of mounting holes 308 sized for engagement with outboard yoke bolts 227 to connect flexible yoke arm 230 to a rotor blade at attachment plane 232. Oblong opening 310 is positioned through body 302 between inboard end 306 and outboard end 304. Oblong opening 310 is sized to accept inboard beams and inboard bearings. Oblong opening 310 is the mounting point for the inboard beams and inboard bearings to the flexible yoke arm. Passage 312 is positioned through body 302 proximate inboard end 306. Passage 312 is axially aligned with hole 216 in the center yoke and is sized to engage bolt 218. Passage 312, hole 216 and bolt 218 all share common central axis 220. Inboard end 306 defines flat tip 314. Flat tip 314 is sized and shaped to engage and be locked/unlocked by a lock mechanism (e.g., a tang lock) attached to center yoke 212. The lock mechanism locks each flexible yoke arm in the unfolded position and when unlocked, allows each flexible yoke arm to rotate relative to the center yoke. The lock mechanism locks each flexible yoke arm in the unfolded and folded positions and when unlocked, allows each flexible yoke arm to rotate relative to the center yoke. Flexible yoke arm 230 further includes central longitudinal axis 316. Central longitudinal axis 316 perpendicularly intersects central axis 220. Inboard end 306 is a "U" shaped clevis having vertically aligned tangs 318, 319 defining space 320 between. Space 320 is sized to engage center yoke 212. Each tang 318, 319 includes passage 312. Tang 318 is adjacent upper surface 215 of center yoke 212 while tang 319 is adjacent lower surface 217 of center yoke 212. Tangss 318, 319 sandwich center yoke 212 in a double shear condition. The double shear condition prevents any rotational moment about the connection of each flexible yoke arm to the center yoke created by centrifugal forces acting on the rotor blade during blade assembly rotation.

For flexibility, each flexible yoke arm 230 may be, for example, a composite part constructed from reinforcement material, such as fiberglass suspended in epoxy resin or a rubber compound. Reinforcement material within flexible yoke arm 230 can be oriented to customize how flexible yoke arm 230 responds to certain loads. For example, fiber reinforcement material can be provided at various angles to customize the stiffness of flexible yoke arm 230 in different directions. Reinforcement material can be arranged within flexible yoke arm 230 such that it is torsionally soft and axially stiff. Flexible yoke arm 230 may allow for torsion forces to be applied by the pitch arms during feathering of the rotor blade, but maintain stiffness in the axial direction to provide strength in connecting the rotor blade to the center yoke 212. Flexible yoke arm 230 may include a number of on-axis load carrying reinforcement layers that are generally aligned with longitudinal axis 316. These layers provide axial stiffness to flexible yoke arm 230, allowing flexible yoke arm 230 to withstand axial forces and couple a rotor blade to the center yoke. Flexible yoke arm 230 may also include a number of off-axis reinforcement layers that provide torsional flexibility to flexible yoke arm 230 such that outboard end 304 may twist about central longitudinal axis 316 with respect to inboard end 306 in response to pitching the rotor blade. The torsional flexibility of flexible yoke arm 230 can be defined at least in part by angle 246 between attachment planes 222, 232. The reinforcement layers of flexible yoke arm 230 may be configured to provide bending flexibility in response to leading or lagging of the rotor blades. Actual flexibility values provided by the constituent materials and arrangement of reinforcement layers are dependent on a particular aircraft's loads and dynamics. A non-limiting example of a composite flexible yoke arm is described in U.S. Pat. No. 9,499,262, entitled Composite Flexure for Tiltrotor Rotor System, the entire disclosure of which is incorporated herein by reference for all purposes.

Figure 4A:
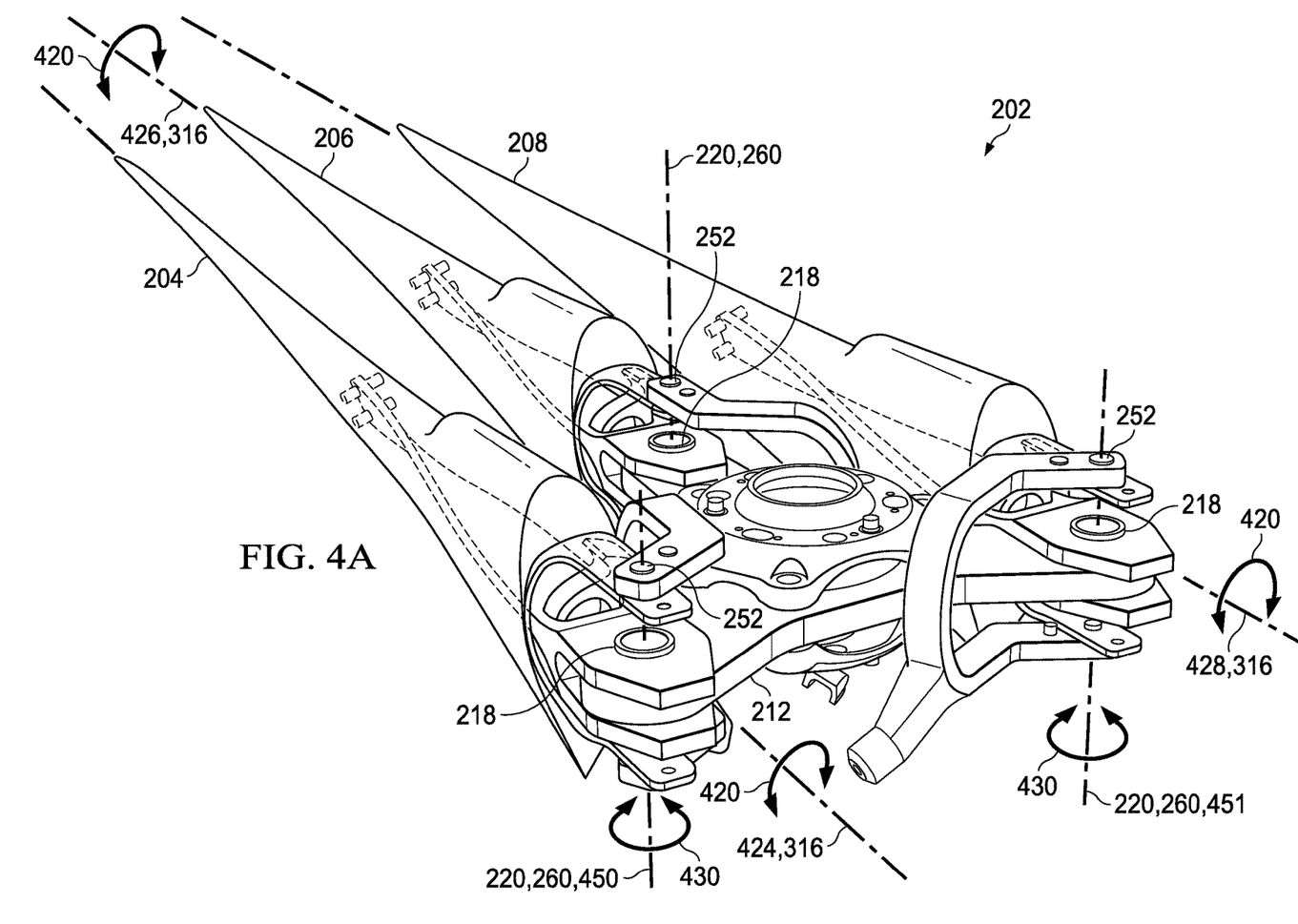
FIG. 4A is a partial perspective view of a rotor blade assembly in a folded position according to aspects of the disclosure.

Referring to FIG. 4A, blade assembly 202 is shown in a folded position. Rotor blade 204 has central longitudinal axis 424. Rotor blade 206 has central longitudinal axis 426. Rotor blade 208 has central longitudinal axis 428. Central longitudinal axes 424, 426, and 428 may also be referred to as blade pitch change axes. Central longitudinal axes 424, 426, and 428, are coaxial with central longitudinal axis 316 of each flexible yoke arm 230. Each rotor blade is free to rotationally pitch about its central longitudinal axis in direction 420 with respect to center yoke 212. As rotor blades 204, 206, and 208 are pitched about their respective longitudinal axis 424, 426, and 428 in direction 420, each flexible yoke arm twists outboard end 304 relative to inboard end 306 about longitudinal axis 316 increasing or decreasing the angle 246 between attachment planes 222, 232.

Rotor blades 204, 206, and 208 are pitched about their respective longitudinal axis 424, 426, and 428 in direction 420 until central axes 220 of holes 216 and bolts 218 are coaxially aligned with the central axes 260 of pivot pins 252. Coaxially aligned central axes 220 and 260 form pivot axis 450 for rotor blade 204 with respect to center yoke 212. Coaxially aligned central axes 220 and 260 form pivot axis 451 for rotor blade 208 with respect to center yoke 212. When central axes 220 and 260 are coaxially aligned, rotor blades 204, 208 can rotate about pivot axes 450, 451 in direction 430. Pivot axes 450, 451 provided by coaxially aligned central axes 220 and 260 are on the centrifugal force ("CF") path of the respective rotor blade.

Figure 4B:
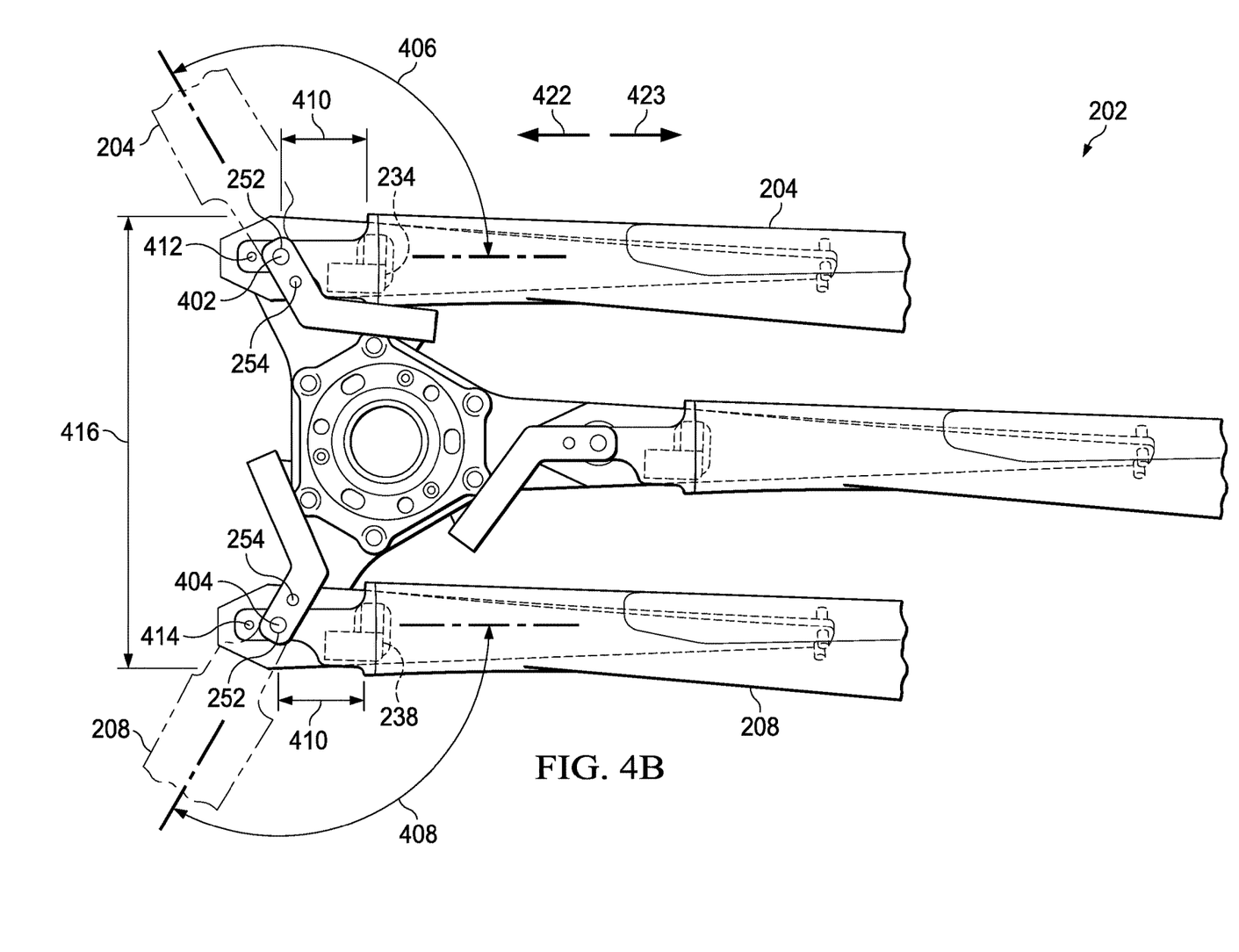
FIG. 4B is a top view of a rotor blade assembly in a folded position according to aspects of the disclosure.

Referring to FIG. 4B, blade assembly 202 is shown in a folded position. Unfolded rotor blade 204 and unfolded rotor blade 208 are depicted in shadow. Rotor blade 204 is rotated in direction 430 at pivot point 402 about pivot axis 450 through angle 406. Rotor blade 208 is rotated in direction 430 at pivot point 404 about pivot axis 451 through angle 408. Axially aligned pivot pins 252 at pivot points 402 and 404 provide pivot axes for the rotor blade with respect to the pitch horn. Bolts 218 at pivot points 402 and 404 provide the pivot axis for each flexible yoke arm and its respective rotor blade with respect to the center yoke. Actuators are operatively connected to the rotor blades to facilitate rotational movement of the rotor blades about the pivot points. Angles 406 and 408 may be in the range of 90° to 180°. Physical stops or proximity sensors signal the actuators to cease rotational movement of the rotor blades.

Rotor blade 204 cannot rotate at pivot point 402 until central axis 220 is aligned with central axis 260 and the axially aligned releasable pins 254 at connection point 412 that connect the aligned arms 242 of each pitch horn to flanges 225 of each split cuff are pulled. Rotor blade 208 cannot rotate at pivot point 404 until central axis 220 is aligned with central axis 260 and the axially aligned releasable pins 254 at connection point 414 that connect the aligned arms 242 of each pitch horn to flanges 225 of each split cuff are pulled. Actuators are connected to releasable pins 254 at connection points 412 and 414 to pull the releasable pins at connection points 412 and 414 free from engagement with the split cuffs. While releasable pins 254 are pulled, pivot pins 252 remain engaged with arms 242 of the pitch horns and flanges 225 of the split cuffs.

Pivot points 402 and 404 are positioned inboard of inboard beams 234 and 238 of rotor blades 204 and 208, respectively. Pivot points 402 and 404 are located a distance 410 in the inboard direction 422 from inboard beams 234 and 238 of rotor blades 204 and 208, respectively. Distance 410 is measured along the central longitudinal axis 424 and 428 of rotor blades 204 and 208, respectively. Pivot points 402 and 404 are positioned on central longitudinal axes 424 and 428. The pivot point of each rotor blade positioned inboard of the inboard beams allows folded profile 416 to be less than if the pivot point were outboard of the inboard beam. Inboard direction 422 points toward the drive mast of a blade assembly while outboard direction 423 points away from the drive mast along the longitudinal axis of a rotor blade.

Figure 5:
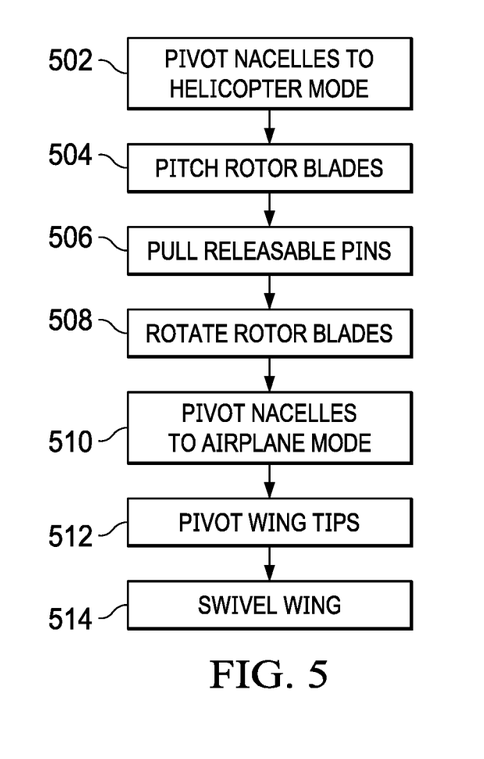
FIG. 5 is a flowchart of the actions performed in converting a tiltrotor aircraft from a flight ready position to a stowed position according to aspects of the disclosure.

Referring to FIG. 5, the actions performed in converting tiltrotor aircraft 100 from a flight ready position to a stowed position are shown. At block 502, nacelles 115 and 117 which house rotor systems 114 and 116, respectively, are pivoted to helicopter mode. Each nacelle is rotated nose up to approximately 90° nacelle angle. A 90° nacelle angle is where the longitudinal axis of the nacelle is generally vertical relative to the ground. The blade assemblies of each rotor system are generally horizontal. At block 504, each rotor blade is pitched about its central longitudinal axis until central axis 220 of bolts 218 and holes 216 is axially aligned with central axis 260 of pivot pins 252 forming pivot axes 450, 451. As each rotor blade is pitched, its respective flexible yoke arm twists outboard end 304 relative to inboard end 306 about longitudinal axis 316 altering the angle 246 between attachment planes 222, 232. In this position, the leading edge of each rotor blade is generally facing upward. This is referred to as indexing the rotor blades. Actuators operatively connected to pitch horns 240 facilitate the change in pitch of the rotor blades.

At block 506, releasable pins 254 connecting the pitch horns to the to-be-folded rotor blades are pulled. Actuators operatively connected to the releasable pins facilitate temporary removal of the pins such that each pitch horn is now connected to the split cuffs by a single pair of axially aligned pivot pins 252. The position and quantity of identified to-be-folded rotor blades can vary depending on rotor blade assembly configuration (e.g., two of the three blades in the illustrated embodiments are folded). At block 508, the rotor blades and attached flexible yoke arms are rotated about the respective pivot axes 450, 451 with respect to the center yoke. Prior to rotation, the lock mechanism attached to the center yoke is operative to unlock the flexible yoke arm relative to the center yoke. Actuators operatively connected to the rotor blades facilitate movement of the rotor blades about bolts 218. The rotor blades are rotated toward the fuselage until the rotor blades are generally parallel with each other at which point physical stops or proximity sensors signal the actuators to cease movement of the rotor blades. At block 510, nacelles 115 and 117 are pivoted to airplane mode. Each nacelle is rotated to approximately 0° nacelle angle. A 0° nacelle angle is where the longitudinal axis of the nacelle is generally horizontal relative to the ground. The blade assemblies of each rotor system remain generally horizontal. At block 512, wing tips 110 and 112 are pivoted toward the fuselage. At block 514, wing 108 is swivelled about vertical axis 122 to lie above and generally align with the fuselage. The entire sequence of converting tiltrotor aircraft 100 from an operational flight ready position to a stowed position can be completed in a range of 1 to 2 minutes in a wind of up to at least 60 knots. It can be interrupted or stopped at any point to facilitate maintenance. Manual operation is possible in the event of a system failure. It is to be understood that several of the previous actions may occur simultaneously or in different order. The order of actions disclosed is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotor blade assembly, comprising:
a hub spring operatively connected to a central mast;
a center yoke connected to the hub spring;
a flexible yoke arm pivotally connected to the center yoke at a pivot point providing a first pivot axis;
a bearing connecting the flexible yoke arm to a rotor blade, the bearing positioned on the flexible yoke arm outboard of the pivot point; and
a pitch horn connected to the rotor blade with a releasable pin and with a pivot pin providing a second pivot axis.

2. The rotor blade assembly of claim 1, wherein the flexible yoke arm is generally parallel with an adjacent flexible yoke arm when the flexible yoke arm is rotated around the pivot point to a folded position.

3. The rotor blade assembly of claim 2, wherein the flexible yoke arm further comprises:
an inboard end, at the pivot point, including a first tang vertically aligned with a second tang; and
the center yoke is between the first tang and the second tang.

4. The rotor blade assembly of claim 2, wherein the bearing comprises an inboard beam, housing an inboard bearing, connected to the flexible yoke arm in an oblong opening formed in the flexible yoke arm outboard of the pivot point.

5. The rotor blade assembly of claim 4, wherein the flexible yoke arm further comprises:
an inboard end, at the pivot point, including a first tang vertically aligned with a second tang; and
the center yoke is between the first tang and the second tang.

6. The rotor blade assembly of claim 2, wherein flexible yoke arm comprises:
a longitudinal axis;
an outboard end connected to the rotor blade in a first attachment plane; and
an inboard end pivotally connected to the center yoke in a second attachment plane, wherein upon rotation of the rotor blade about the longitudinal axis, the flexible yoke arm twists and an angle between the first attachment plane and the second attachment plane is altered.

7. The rotor blade assembly of claim 1, wherein the flexible yoke arm further comprises:
an inboard end, at the pivot point, including a first tang vertically aligned with a second tang; and
the center yoke is between the first tang and the second tang.

8. The rotor blade assembly of claim 1, wherein upon removal of the releasable pin and coaxial alignment of the first pivot axis with the second pivot axis, the flexible yoke arm can rotate about the pivot point.

9. The rotor blade assembly of claim 1, wherein the bearing further comprises:
an inboard beam, housing an inboard bearing, connected to the flexible yoke arm in an oblong opening formed in the flexible yoke arm outboard of the pivot point.

10. The rotor blade assembly of claim 1, wherein flexible yoke arm further comprises:
a longitudinal axis;
an outboard end connected to the rotor blade in a first attachment plane;
an inboard end pivotally connected to the center yoke in a second attachment plane; and
wherein upon rotation of the rotor blade about the longitudinal axis, the flexible yoke arm twists and an angle between the first attachment plane and the second attachment plane is altered.

11. A method for folding a rotor blade assembly comprising a flexible yoke arm connected to a rotor blade in a first attachment plane and pivotally connected to a center yoke including a first pivot axis in a second attachment plane, a pitch horn connected to the rotor blade at a releasable connection and at a pivotable connection including a second pivot axis, and a bearing connected to the flexible yoke arm outboard of the first pivot axis, the method comprising:
pitching the rotor blade such that an angle between the first attachment plane and the second attachment plane is altered;
releasing the releasable connection; and
rotating the flexible yoke arm about the first pivot axis and the second pivot axis.

12. The method of claim 11, wherein pitching the rotor blade includes axially aligning the first pivot axis with the second pivot axis.

13. The method of claim 11, wherein:
the rotor blade assembly is operatively connected to a nacelle pivotally mounted to a wing; and
pivoting the nacelle to a 90° nacelle angle.

14. The method of claim 13, wherein subsequent to rotating the flexible yoke arm, further comprising, pivoting the nacelle to a 0° nacelle angle.

15. The method of claim 11, wherein the rotor blade assembly is operatively connected to a nacelle pivotally mounted to a wing, further comprising, pivoting a wing tip of the wing.

16. The method of claim 11, wherein the rotor blade assembly is mounted to a wing and the wing is mounted to a fuselage, further comprising, subsequent to rotating the flexible yoke arm, swivelling the wing about its vertical axis to align with the fuselage.

17. The method of claim 11, wherein pitching the rotor blade includes axially aligning the first pivot axis with the second pivot axis
the rotor blade assembly is operatively connected to a nacelle pivotally mounted to a wing; and
further comprising pivoting the nacelle to a 90° nacelle angle.

18. The method of claim 17, further comprising, subsequent to rotating the flexible yoke arm, pivoting the nacelle to a 0° nacelle angle.

19. The method of claim 11, wherein pitching the rotor blade includes axially aligning the first pivot axis with the second pivot axis;
the rotor blade assembly is operatively connected to a nacelle pivotally mounted to a wing; and
further comprising pivoting a wing tip of the wing.

20. The method of claim 11, wherein pitching the rotor blade includes axially aligning the first pivot axis with the second pivot axis;
the rotor blade assembly is mounted to a wing and the wing is mounted to a fuselage; and further comprising, subsequent to rotating the flexible yoke arm, swivelling the wing about its vertical axis to align with the fuselage.

* * * * *